US012602669B2

(12) United States Patent
Jiang et al.

(10) Patent No.: US 12,602,669 B2
(45) Date of Patent: Apr. 14, 2026

(54) ACTOR MODEL PAYMENT PROCESSING ENGINE

(71) Applicant: Royal Bank of Canada, Toronto (CA)

(72) Inventors: Shangjia Jiang, Richmond Hill (CA);
Sohan Ganapathy, Burlington (CA);
Raju Marimuthu, Brampton (CA)

(73) Assignee: Royal Bank of Canada, Toronto (CA)

( * ) Notice: Subject to any disclaimer, the term of this patent is extended or adjusted under 35 U.S.C. 154(b) by 135 days.

(21) Appl. No.: 18/477,433

(22) Filed: Sep. 28, 2023

(65) Prior Publication Data

US 2024/0104519 A1 Mar. 28, 2024

Related U.S. Application Data

(60) Provisional application No. 63/410,997, filed on Sep. 28, 2022.

(51) Int. Cl.
*G06Q 20/02* (2012.01)
*G06Q 20/38* (2012.01)
*G06Q 20/40* (2012.01)

(52) U.S. Cl.
CPC .......... *G06Q 20/02* (2013.01); *G06Q 20/389* (2013.01); *G06Q 20/4016* (2013.01)

(58) Field of Classification Search
CPC ...................................................... G06Q 20/02
See application file for complete search history.

(56) References Cited

U.S. PATENT DOCUMENTS

| | | | | |
|---|---|---|---|---|
| 11,507,947 B1 * | 11/2022 | McMahon | ............. | G06Q 20/10 |
| 2021/0192509 A1 * | 6/2021 | Eskandarian | .......... | G06Q 20/38 |
| 2024/0037559 A1 * | 2/2024 | Mehta | ................... | G06Q 20/40 |

OTHER PUBLICATIONS

Bo, S. "Programming Support for Scalable, Serializable, and Elastic Cloud Applications," Purdue Dissertation, from Proquest, on 2020, (Year: 2020).*

* cited by examiner

*Primary Examiner* — Mike Anderson
*Assistant Examiner* — Brandon M Duck

(57) ABSTRACT

Methods, systems, and techniques for using an actor model payment processing engine to process payments. A payment instruction is received. An event corresponding to the payment instruction is stored in an event journal. The payment processing engine, which is event-sourced and actor-based, performs the payment instruction. Performing the payment instruction involves transitioning the engine through one or more states in response to the payment instruction, and may involve performing actions with non-event sourced and event sourced actors in both stateless and stateful environments.

17 Claims, 13 Drawing Sheets

ACTOR MODEL PAYMENT PROCESSING ENGINE

CROSS-REFERENCE TO RELATED APPLICATION

The present application claims priority to U.S. provisional patent application No. 63/410,997, filed on Sep. 28, 2022, and entitled "Actor Model Payment Processing Engine", the entirety of which is hereby incorporated by reference herein.

TECHNICAL HELD

The present disclosure is directed at methods, systems, and techniques for a payment processing engine implemented using an actor model.

BACKGROUND

"Real-time payments" comprise payments from one individual to another, from a consumer to a business, and between businesses, made in real-time. The payments may be made, for example, through an interbank network such as the Interac™ network or via technologies such as Lynx, Large Value Transfer System (LVTS), and Real-time Rail (RTR). Given the popularity of real-time payments and consumer expectations, it is not uncommon for a financial institution to have to process over 100 payments per second, have uptime of over 99%, and be failure resistant.

SUMMARY

According to a first aspect, there is provided a payment processing method comprising: receiving a payment instruction; storing, in an event journal, an event corresponding to the payment instruction; and performing the payment instruction using an event-sourced, actor-based system, wherein performing the payment instruction comprises transitioning the actor-based system through one or more states in response to the payment instruction.

Performing the payment instruction comprises performing at least one action in a stateless environment and, subsequently, at least one action in a stateful environment, wherein a payment is made in response to the payment instruction in the stateful environment.

The stateless environment may comprise at least one non-event sourced actor and the stateful environment may comprise at least one event sourced actor, and the method may further comprise the at least one non-event sourced actor publishing commands into a command store, and the at least one event-sourced actor retrieving the commands from the command store. The command store may comprise a Kafka™ topic.

The at least one event sourced actor may perform a real-time fraud determination on the payment instruction prior to making the payment.

The at least one non-event sourced actor may perform payment fund reservation in the stateless environment.

The at least one non-event sourced actor may further perform at least one of account validation or payment scoring in the stateless environment.

The method may further comprise: publishing, by the at least one non-event sourced actor, at least one message to the command store; retrieving, by the at least one event sourced actor, the at least one message; and in response to each of the at least one message, using the at least one event sourced actor to write state information representative of a current state of the at least one event sourced actor to the event journal.

The at least one message published by the at least one non-event sourced actor may comprise a post-funds reservation message confirming funds for the payment have been reserved.

The at least one message published by the at least one non-event sourced actor may further comprise a pre-funds reservation message confirming a request to reserve the funds for the payment has been made and the funds are not yet reserved. For example, the funds reservation request may comprise a synchronous request to reserve funds, and the request may have timed out.

In response to a fault during performing of the at least one action in the stateful environment, the method may further comprise: retrieving the state information from the event journal; and continuing performance of the at least one action in the stateful environment from a state corresponding to the state information.

The at least one non-event sourced actor and the at least one event sourced actor may comprise part of a cluster of the actors redundantly implemented on at least a first pod and a second pod, each of the pods may comprise at least one commonly hosted container, the fault may be experienced by one of the pods, and the state information may be retrieved from the event journal and the performance may be continued by the other of the pods.

The payment instruction may comprise one of a plurality of payment instructions, the actor-based system may be redundantly implemented using a primary system and a secondary system, each of the primary and secondary systems may comprise the command store, a cluster of the actors, and a recovery application, and the method may further comprise: processing an initial group of the plurality of payment instructions using the primary system; and in response to unavailability of the primary system: using the recovery application of the secondary system, shunting unperformed commands from the command store of the primary system to the command store of the secondary system for performance; and processing the plurality of payment instructions after the initial group using the secondary system.

In response to unavailability of the primary system and prior to shunting the unperformed commands, the recovery application of the secondary system may further: verify, using a heartbeat of the secondary system, that the secondary system is healthy; and verify, using a heartbeat of the primary system, and that the primary system is unhealthy.

In response to unavailability of the primary system, the recovery application of the secondary system may further update a datacenter affinity parameter such that the plurality of payment instructions after the initial group are processed by the secondary system.

The payment instruction may comprise one of a plurality of payment instructions, the actor-based system may be redundantly implemented using a primary system and a secondary system, and the method may further comprise: disproportionately routing the plurality of payment instructions to either the primary system or the secondary system; updating software of the one of the primary system or the secondary system receiving disproportionately fewer of the plurality of payment instructions; and after the updating: disproportionately routing the plurality of payment instructions to the other of the primary system or the secondary system; and updating software of the other of the primary or the secondary system.

The actor-based system may be redundantly implemented using a primary system and a secondary system, each of the primary and secondary systems may comprise a database and the database of the secondary system may be a replica of the database of the primary system, each of the primary and secondary systems may determine whether to write to the database of the primary system or the secondary system using a domain name server, and the method may further comprise: detecting a failure in the database of the primary system; and updating the domain name server to route database reads and writes of the primary and secondary systems to the database of the secondary system.

According to another aspect, there is provided a payment processing system comprising: an event journal; an event-sourced, actor-based payment processing engine configured to perform a method comprising: receiving a payment instruction; storing, in the event journal, an event corresponding to the payment instruction; and performing the payment instruction, wherein performing the payment instruction comprises transitioning the payment processing engine through one or more states in response to the payment instruction.

According to another aspect, there is provided a non-transitory computer readable medium having encoded thereon computer program code that is executable by a processor and that, when executed, causes the processor to perform a payment processing method comprising: receiving a payment instruction; storing, in an event journal, an event corresponding to the payment instruction; and performing the payment instruction using an event-sourced, actor-based system, wherein performing the payment instruction comprises transitioning the actor-based system through one or more states in response to the payment instruction.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Processing the volume of real-time payments that can be demanded by consumers in a modern economy that is increasingly dominated by electronic commerce poses a significant technical problem. Processing those payments in a volume typically required in practice (e.g., over 100 payments per second reliably and with an uptime of over 99%) requires a technical implementation suited to such volume, responsiveness, and resiliency.

The embodiments described herein are directed at an actor model payment processing engine (PPE) implemented to solve this technical problem. In at least some embodiments, the PPE uses event sourcing behavior implemented using a finite state machine and a Command Query Responsibility Segregation (CQRS) pattern with auto-scaling and self-healing capabilities to build a flexible and scalable payment processing solution. An actor model with in-memory messaging for performance and event sourcing behavior may be used to avoid data loss. This helps to achieve a payment processing solution that can support the high throughput required of practical applications more efficiently by using fewer computing resources than existing technology. In particular, alternative technologies such as relying on a database to maintain fine-grained state transition or retrieval, or other external event-driven messaging solutions, are unable to scale as well, are more complex, and/or have higher latencies than the embodiments described herein.

Figure 1:
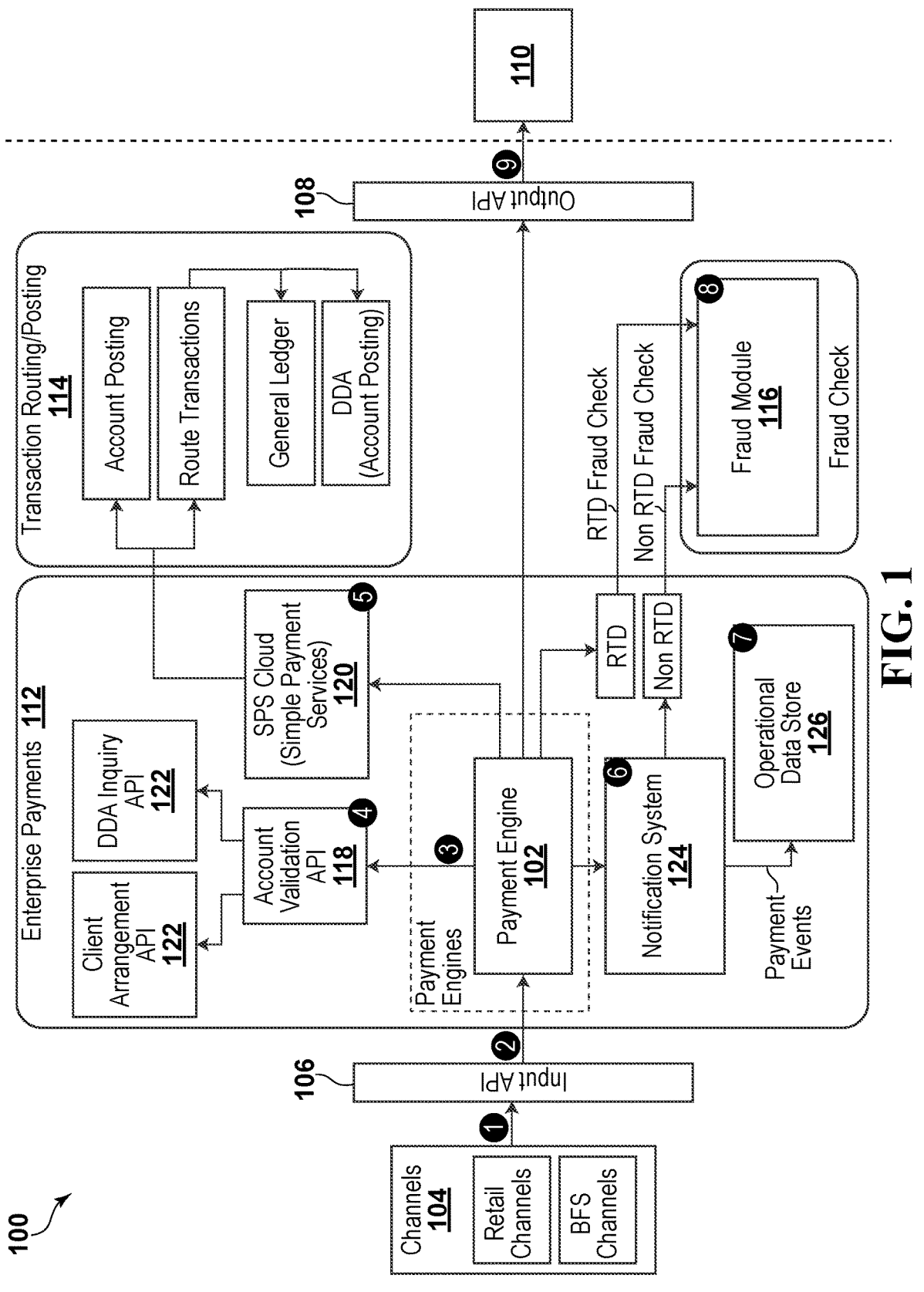
FIGS. 1, 2A, and 2B depict block diagrams of an actor model payment processing engine, according to example embodiments.

Referring now to FIG. 1, there is shown a block diagram 100 of an actor model payment processing engine 102, according to an example embodiment. In FIG. 1, payment instructions are received via channels 104, such as retail and business channels. The instructions are sent via an input application programming interface (API), such as an Apigee™ API, to an actor model PPE 102, which comprises part of an enterprise payments module 112. Following processing, as described further below, the PPE 102 outputs instructions via an output API 108, such as an Apigee™ API, to an interbank network 110 such as the Interac™ network. The output API 108 exposes endpoints to be called on the interbank network 110, comprising sending a payment to the interbank network 110, scoring a payment on the interbank network 110, cancelling a payment on the interbank network 110, and updating transfer authentication on the interbank network 110.

The PPE 102 may also request account validation via an account validation API, which leverages a client arrangement API and demand deposit account (DDA) inquiry API 122. The PPE 102 may also access payment services via a simple payment system (SPS) cloud module 120, which subsequently routes and posts transactions via a transaction routing and posting module 114.

The PPE 102 may also perform a fraud check on the payment in real-time using real-time decisioning (RTD) to perform the fraud check using a fraud module 116. The PPE 102 may also do fraud checks not in real-time (e.g., in the context of an audit done after the fact in respect of a large number of payments). In this case, the PPE 102 may perform a non-RTD fraud check via a notification system 124, which pushes payment notifications based on the payments processed by the PPE 102. Some of the payment notifications are pushed and stored in an operational data store 126, which keeps an event history of processed payments.

In an example payment processed by the PPE 102, the channels 104 pass a payment instruction as the payload of an ISO 20022 Pain.001 message (reference numeral 1). The input API 106 exposes the PPE's 102 endpoints via Representational State Transfer (REST), for consumption from a client(s) making the related payment (reference numeral 2). The payment instruction is passed to the PPE 102 (reference numeral 3). The PPE 102 performs account validation (reference numeral 4) to confirm the owner of the account from and/or to which payment is to be made and that the account is in good standing by leveraging the account validation API 118 and the client arrangement and DDA inquiry APIs 122. Following account validation, the PPE 102 sends the payment instruction to a payment service via the SPS cloud module 120 (reference numeral 5); the payment service handles debits and credits for payments on accounts by posting to an online teller system in the transaction routing and posting module 114 for intraday posting to deposit accounts, and an end of day financial transaction posting system for end of day posting to deposit accounts. The PPE 102 uses the notification system 124 to publish payment-related events that occur during the payment lifecycle as appropriate; for example, the notification system 124 may be implemented using Apache Kafka™, in which case the notification system 124 publishes notifications to the appropriate Kafka™ topic for subsequent retrieval. In the example of FIG. 1, the notification system 124 publishes payment-related events to the payments domain topic (reference numeral 6), which stores payments lifecycle events. The PPE 102 also publishes all payments lifecycle events to the operational data store 126 (reference numeral 7) and performs a fraud check (reference numeral 8) as described above. After the fraud check, the PPE 102 completes payment processing (e.g., sends the payment) via the interbank network 110. For example, when the interbank network 110 is the Interac™ network, the PPE 102 calls the "Send Payment" API via the Interac™ network.

Figure 2A:
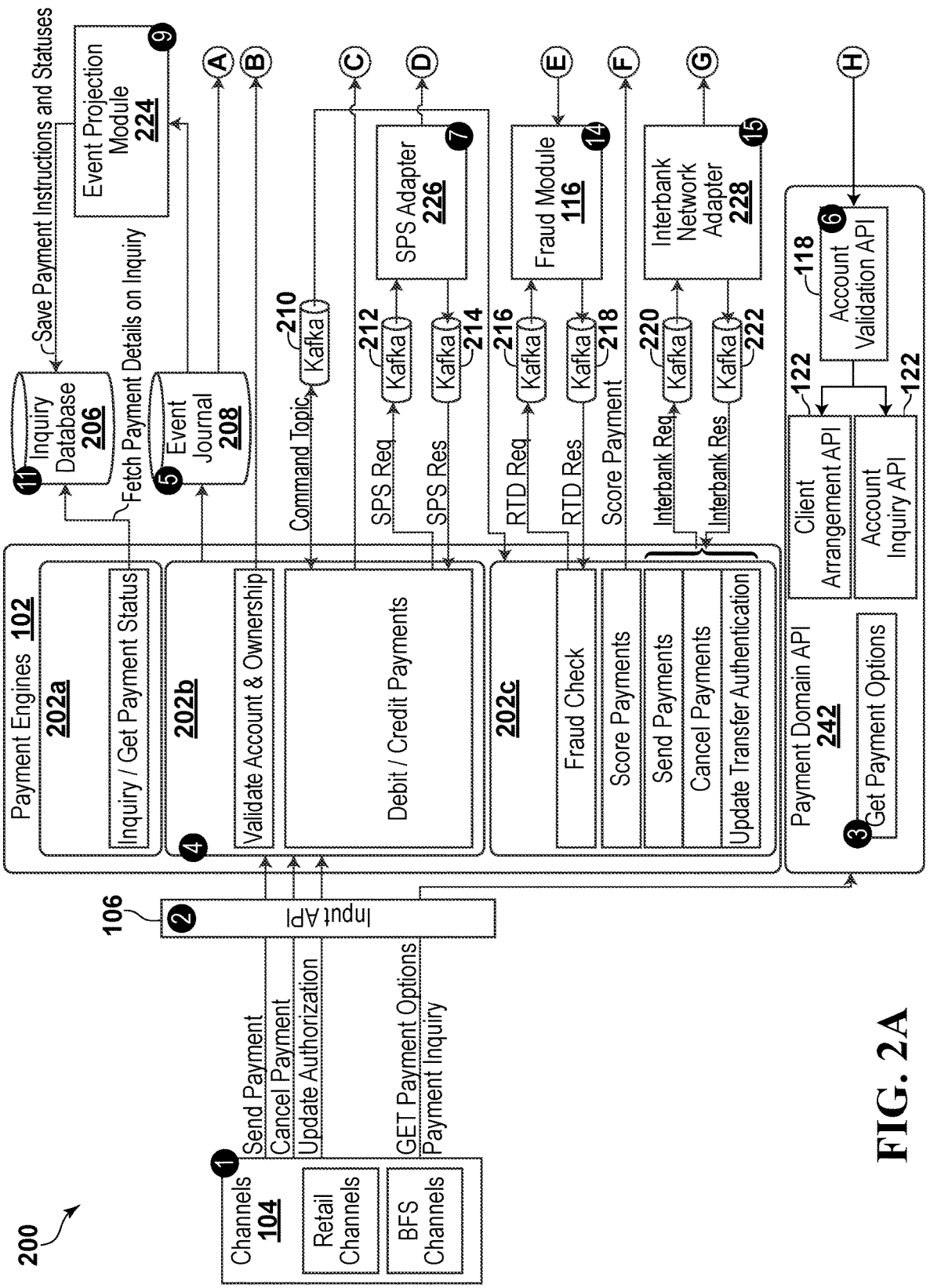
Figure 2B:
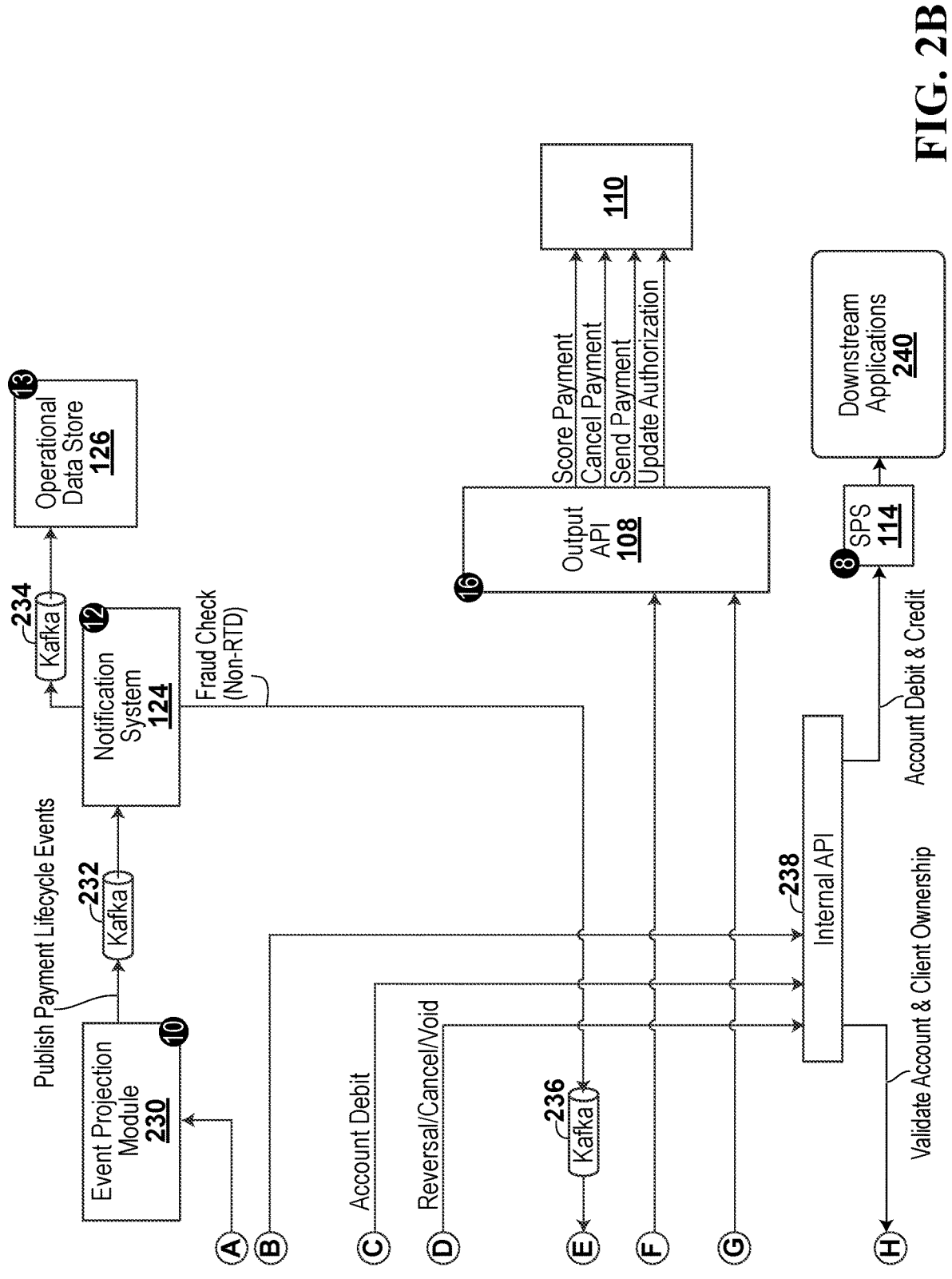

Referring now to FIGS. 2A and 2B, there is shown a block diagram 200 of the PPE 102, according to another example embodiment. The block diagram 200 of FIGS. 2A and 2B depicts an embodiment in which the PPE 102 is implemented using Kafka™, and accordingly FIGS. 2A and 2B also show various Kafka™ topics and databases.

More particularly, in FIGS. 2A and 2B the channels 104 are communicative with the input API 106. The input API 106 is communicative with a payment domain API 242, which comprises the client arrangement and DDA inquiry APIs 122 and the account validation API 118; and the payment engines 102. The payment engines 102 comprise first through third payment processing engines 202*a-c* (each a "PPE"). The first PPE 202*a* performs processing in respect of payment inquiries and obtaining payment statuses; the second PPE 202*b* performs processing in respect of validating accounts and ownership and in respect of debit/credit payments; and the third PPE 202*c* performs processing in respect of fraud checks, payment scores, payment sending, payment canceling, and updating transfer authentications.

The first PPE 202*a* is communicative with an inquiry database 206 to fetch payment details on an inquiry. The second PPE 202*b* is communicative with an event journal 208, which is communicative with a first event projection module 224, which in turn is communicative with the inquiry database 206 in order to save payment instructions and statuses. The event journal 208 is also communicative with a second event projection module 230, which publishes payment lifecycle events to an eighth Kafka™ topic 232. The eighth Kafka™ topic 232 pushes notifications to clients via the notification system 124. The notification system 124 pushes notifications to a ninth Kafka™ topic 234, which sends messages to the operational data store 126. The event journal 208 manages the Event Journal/State Store of a Credit Transfer transactions processed by an Akka™ framework used by the PPE 102. The projection modules 224, 230 are to replicate and transform data from the event journal 208 and to propagate materialized views to the inquiry database 206 (for the first event projection module 224) and to populate the ninth Kafka™ topic 234 with events (for the second event projection module 230). This is an implementation of CQRS to segregate inquiry from commands (processing).

The first event projection module 224 leverages Akka Projections™ to poll the event journal 208 and act on certain state changes. The first event projection module 224 then populates/updates the inquiry database 206 with these state changes. The inquiry database 206 holds immutable payment instructions and payment statuses and is populated by the PPE 102 based on payment lifecycle events. The PPE 102 provides inquiry end points for reconciliation and settlement and the deposit processing system for the interbank 110 network.

The second event projection module 230 leverages Akka Projections™ to poll the event journal 208 and act on certain state changes. The second event projection module 230 then publishes payment events to the notification system 124.

The second PPE 202*b*, in respect of account and ownership functionality, is communicative with an internal API 238 (such as an internal APIGEE™ gateway), which performs account validation and client ownership using the account validation API 118 and the client arrangement and DDA inquiry APIs 122.

The second PPE 202*b*, in respect of debit/credit payments, is communicative with a first Kafka™ topic 210 in respect of command topics; and second and third Kafka™ topics 212, 214 in respect of SPS requisitions and responses, respectively; and also with the internal API 238 in order to perform account debit and credit via the transaction routing and posting module 114 and various downstream applications 240. The second and third Kafka™ topics 212, 214 send messages to and receive messages from an SPS adapter 226, which is communicative with the internal API 238. The SPS adapter 226 listens to the second Kafka™ topic 212 and calls debit/credit APIs on the transaction routing and posting module 114. Once a call has been successful the SPS adapter 226 publishes the response on the third Kafka™ topic 214 notifying the PPE 102 of the call to the transaction routing and posting module 114 for completion. Any calls to retry SPS and other resiliency patterns, such as acting as a circuit breaker, are handled by the SPS adapter 226. The SPS adapter 226 is used for Cancel/VOID SPS calls; debit calls use the first Kafka™ topic 210.

The third PPE 202*c* receives messages from the first Kafka™ topic 210. The third PPE 202*c*, in respect of fraud checks, is communicative with fourth and fifth Kafka™ topics 216, 218 in respect of real-time decisioning requisitions and responses, respectively. In respect of payment scores, the third PPE 202*c* scores payment via the output API 108. In respect of sending and canceling payments, and updating transfer authentication, the third PPE 202*c* sends interbank network requisitions and responses via sixth and seventh Kafka™ topics 220, 222. The notification system 124 sends notifications to a tenth Kafka™ topic 236, which sends messages to the fraud module 116. The fraud module 116 respectively receives and sends messages from and to the fourth and fifth Kafka™ topics 216, 218. The sixth and seventh Kafka™ topics 220, 222 send messages to and receive messages from an interbank network adapter 228, which is communicative with the output API 108. The output API 108 is communicative with the interbank network 110. More particularly, the interbank network adapter 228 listens to the sixth Kafka™ topic 220 and calls a Send Payment API to send a payment on the interbank network 110. Once the call has been successful the interbank network adapter 228 publishes the response on the seventh Kafka™ topic 222 notifying the PPE 102 of the call completion. Any call retries and other resiliency patterns, such as circuit breaker functionality, are handled by the interbank network adapter 228.

Certain functionality performed by various components of the system depicted in FIGS. 2A and 2B is described further below.

Payment processing beings with the channels 104 sending a payment instruction. As shown in FIGS. 2A and 2B, the instruction may be Send Payment, Cancel Payment, Update Authentication, GET Payment Options, and Payment Inquiry, for example. The instructions are routed through the Input API 106 and are sent to the Get Payment Options API. The Get Payment Options API helps determine what the available transfer options are for a specific recipient based on metadata such as, for example, the recipient's e-mail address, phone number, or account information. The channels 104 capture, validate, and authorize the payment instruction, and then build a Pain.001 payload and calls the "Send Credit Transfer" endpoint in the PPE 102. The response from the PPE 102 is a Pain.002 payload on success or failure.

The PPE 102 uses an Akka™ framework to orchestrate various interactions used to complete a credit transfer (i.e., payment) transaction. The PPE 102 performs functionality comprising:

1. Schema Validations and Duplicate Checks. The Send Credit transfer endpoint in the PPE 102 consumes a Pain.001 payload. The PPE 102 validates the schema and data sent to the PPE 102 and determines if it is a duplicate transaction.
2. Score Payments. The PPE 102 may score payments via, for example, an API call made using the output API 108.
3. Debit and Credit Payments. The PPE 102 may call SPS component(s) via the internal API to debit money before calling the interbank network 110 to send the payment. The SPS component(s) may also be invoked to credit money that was debited but not transferred due to a failure to transfer from the interbank network 110 or failure resulting from fraud or payment execution timeouts.
4. Fraud Checks. The PPE 102 publishes Kafka™ events used for non-real time detection events to the tenth Kafka™ topic 236 for consumption by the fraud module 116. For real-time detection, the PPE 102 publishes requests to the fourth Kafka™ topic 216 for retrieval and processing by the fraud module 116, and receives responses from the fraud module 116 via the fifth Kafka™ topic.
5. Publish Lifecycle Events. The PPE 102 publishes lifecycle events to the eighth Kafka™ topic 232 for use by the notification system 124 and operational data store 126.
6. Send Payments via the Interbank Network 110. The PPE 102 sends money to recipients via the interbank network 110.

Figure 3A:
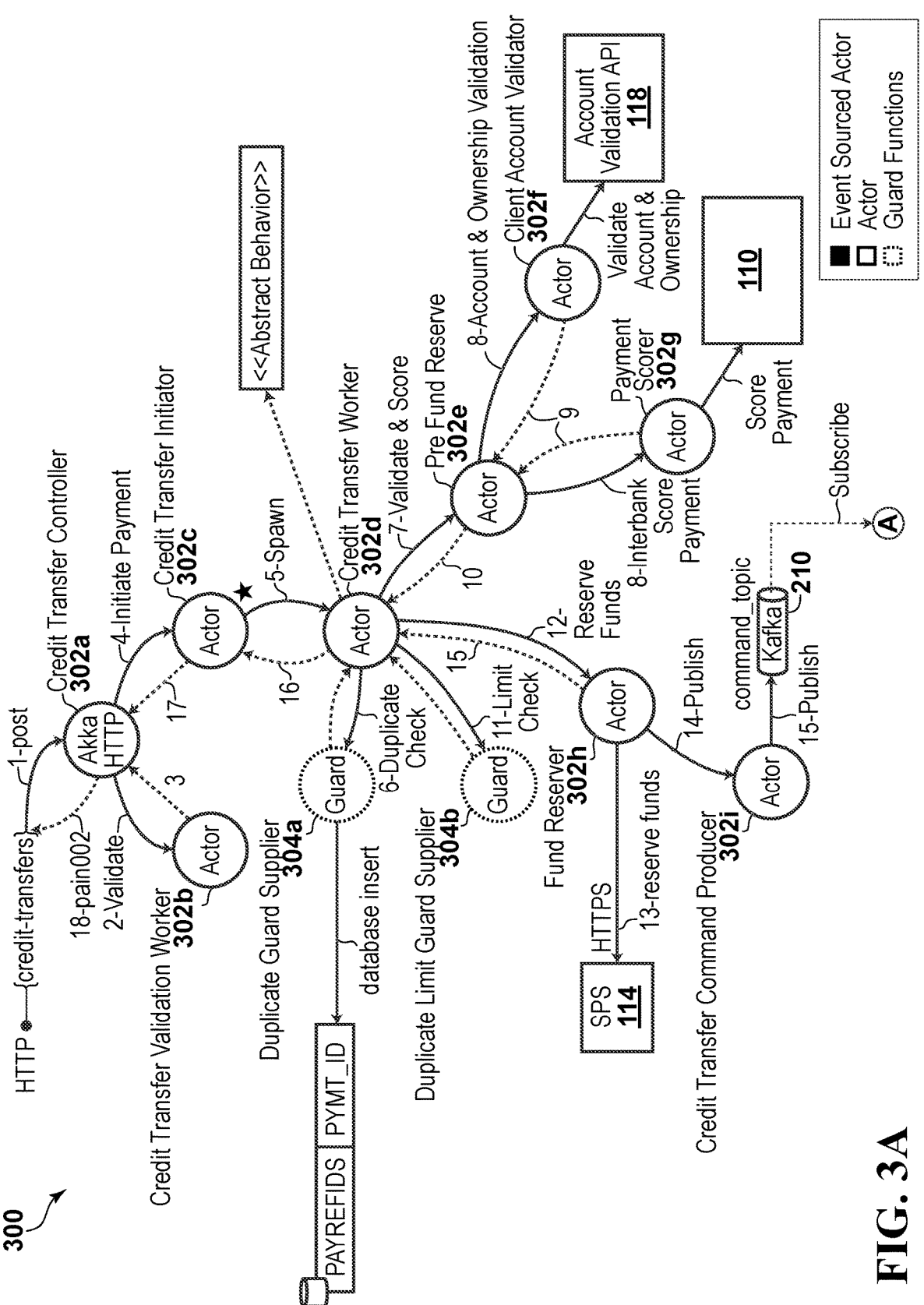
FIGS. 3A and 3B depict an example actor model implemented by the payment processing engine of FIGS. 1 and 2.
Figure 3B:
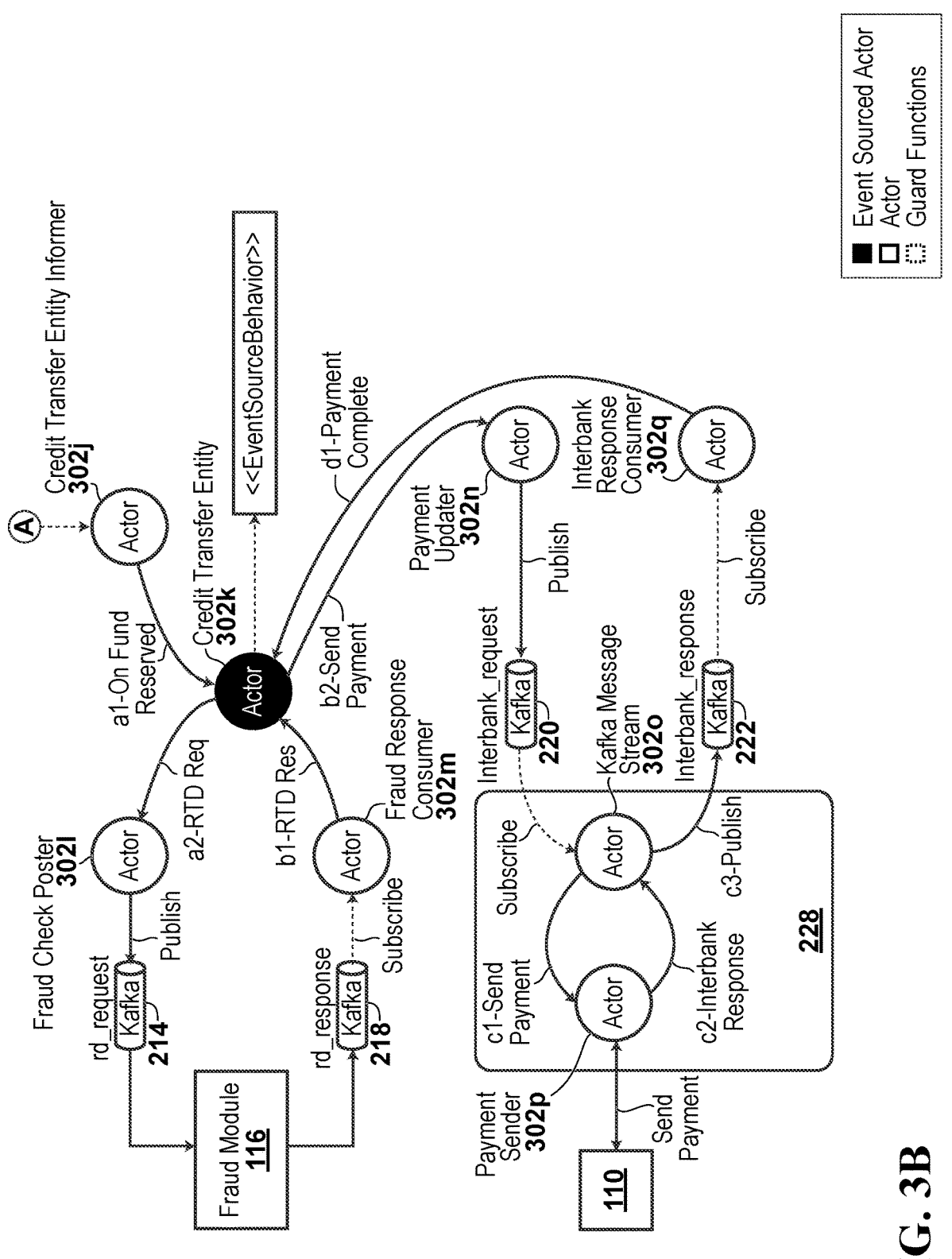

FIGS. 3A and 3B depict an example actor model 300 implemented by the PPE 102 when performing a payment operation. As mentioned above, the PPE 102 of FIGS. 1, 2A, and 2B may be implemented using an Akka™ framework. This is reflected in FIGS. 3A and 3B, which depict first through seventeenth actors 302*a-q* used to implement the "Send Credit Transfer" functionality of the PPE 102 mentioned above.

In FIG. 1, a payment instruction message in the form of a Pain.001 payload arrives (arrow 1) at the first actor 302*a*. The first actor 302*a* acts as a credit transfer controller and proceeds to validate (arrow 2) the schema and data sent to the first actor 302*a* using the second actor 302*b*, which acts as a credit transfer validation worker. Assuming validation is successful (arrow 3), the first actor 302*a* initiates payment (arrow 4) by messaging the third actor 302*c*, which acts as a credit transfer initiator. The third actor 302*c* spawns (arrow 5) the fourth actor 302*d*, which acts as a credit transfer worker.

The fourth actor 302*d* is central to various actions:

1. The fourth actor 302*d* confirms the requested payment instruction is not a duplicate transaction (arrow 6). It does this via a first guard function 304*a*.
2. Using a fifth actor 302*e* (arrow 7), the fourth actor 302*d* concurrently performs account and ownership validation (top arrow 8) and scores the payment (bottom arrow 8) using the interbank network 110. The fourth actor 302*d* validates account and ownership information via a sixth actor 302*f*, which performs the actual validation using the account validation API 118. The fourth actor scores the payment using seventh actor 302*g*, which performs payment scoring using via the interbank network 110.
3. The fourth actor 302*d* confirms that the requested payment instruction is within the credit limit of the debtor/transferor (arrow 11). It does this via a second guard function 304*b*.
4. Assuming the payment instruction is successfully validated, scored, and is confirmed not to be a duplicate, the funds for the payment are reserved. To do this, the fourth actor 302*d* messages (arrow 12) the eighth actor 302*h*. The eighth actor 302*h* reserves funds by calling the transaction routing and posting module 114.

Once the funds for the transfer have been reserved, the eighth actor 302*h* publishes (arrow 14) a message to the ninth actor 302*i*, which produces and publishes (arrow 15—Publish) a payment transfer command to the first Kafka™ topic 210, which acts as a command store. As indicated on FIG. 3A, once the funds are reserved the eighth actor 302*h* also returns a message to the first actor 302*a* via the third and fourth actors 302*c,d* (dashed arrows 15-17) to inform the first actor 302*a* that funds have been reserved for transfer. In response to this message, the first actor 302*a* may respond (arrow 18) to the original payment instruction message using a response with a Pain.002 payload, as shown in FIG. 3A.

In at least some embodiments, the eighth actor 302*h* is programmed to publish two messages to the ninth actor 302*i* for storing in the first Kafka™ topic 210. A first message ("pre-funds reservation message") indicates that the eighth actor 302*h* has made a request to reserve the funds using the transaction routing and posting module 114. A second message ("post-funds reservation message") indicates whether the fund reservation was successful. The eighth actor 302*h* may publish the first message immediately after requesting fund reservation from the transaction routing and posting module 114. The second message may be published once funds are confirmed as having been reserved by the transaction routing and posting module 114, or in the event the request to reserve funds is synchronous and times out without success.

The tenth actor 302*j* is subscribed to the first Kafka™ topic 210 to receive the commands it stores and to forward them to the eleventh actor 302*k*. Unlike the first through tenth actors 302*a-j* and the twelfth through seventeenth actors 302*l-q*, the eleventh actor 302*k* is an event sourced actor. The first Kafka™ topic accordingly represents a delineation between validating the payment instruction and reserving funds for the payment transfer, which is done in a stateless manner by the PPE 102; and executing the payment instruction by performing fraud checking and the actual money transfer, as described below, in a stateful manner. In particular, the eleventh actor 302*k* receives the pre-funds reservation message and the post-funds reservation message and in response to each writes state information to the event journal 208. This accordingly persists state information in respect of pre-funds reservation and post-funds reservation states, both of which may be used when resuming system operation following some type of fault as described further below in respect of FIG. 5.

More particularly, the eleventh actor 302*k* is central to various actions:

1. Following confirmation that funds have been reserved (arrow a1), the eleventh actor 302*k* performs an RTD fraud check using the twelfth actor 302*l* (arrow a.2), which posts an RTD fraud request to the fraud module 116 via the third Kafka™ topic; and using the thirteenth actor 302*m*, which receives the result of the RTD fraud check from the fraud module 116 via the fifth Kafka™ topic. The thirteenth actor 302*m* returns the result of the fraud check to the tenth actor 302*k* via arrow b.1.

2. Assuming the payment instruction passes the RTD fraud check, the eleventh actor 302*k* actually transfers money using the interbank network 110 via the inter-bank network adapter 228. Namely, the eleventh actor 302*k* instructs the fourteenth actor 302*n* to send the payment (arrow b.2). The fourteenth actor 302*n* publishes this request to the sixth Kafka™ topic 220. The interbank network adapter 228 comprises the fifteenth actor 302*o*, which subscribes to the sixth Kafka™ topic 220 and accordingly receives the payment request. The fifteenth actor 302*o* sends (arrow c.1) the retrieved request to the sixteenth actor 302*p*, which sends the request to the interbank network 110.

3. The sixteenth actor 302*p* receives the response from the interbank network 110 confirming that the payment successfully completed. This response is sent (arrow c.2) from the sixteenth actor 302*p* to the fifteenth actor 302*o*, which publishes (arrow c.3) the response to the seventh Kafka™ topic 222. The seventeenth actor 302*q* subscribes to the seventh Kafka™ topic 222 and accordingly receives the response, and notifies (arrow d.1) the eleventh actor 302*k* that the payment is complete.

Dividing the "Send Credit Transfer" into stateless (prior to the first Kafka™ topic 210) and stateful (after the first Kafka™ topic 210) helps the PPE 102 accommodate systems that may be relatively slow or unreliable. In particular, account validation using the account validation API 118, reserving funds using the transaction routing and posting module 114, and payment scoring using the interbank network 110 is handled in a stateless manner. This helps make the PPE 102 more resilient in the event the any of the account validation API 118, the transaction routing and posting module 114, the interbank network 110, or the network connections thereto are unresponsive. Maintaining part of the PPE 102 in a stateless manner also assists with scaling the PPE 102, particularly horizontally, and in reducing memory or computational requirements during operation because state information for fund reservation and account validation does not need to be stored.

Figure 4A:
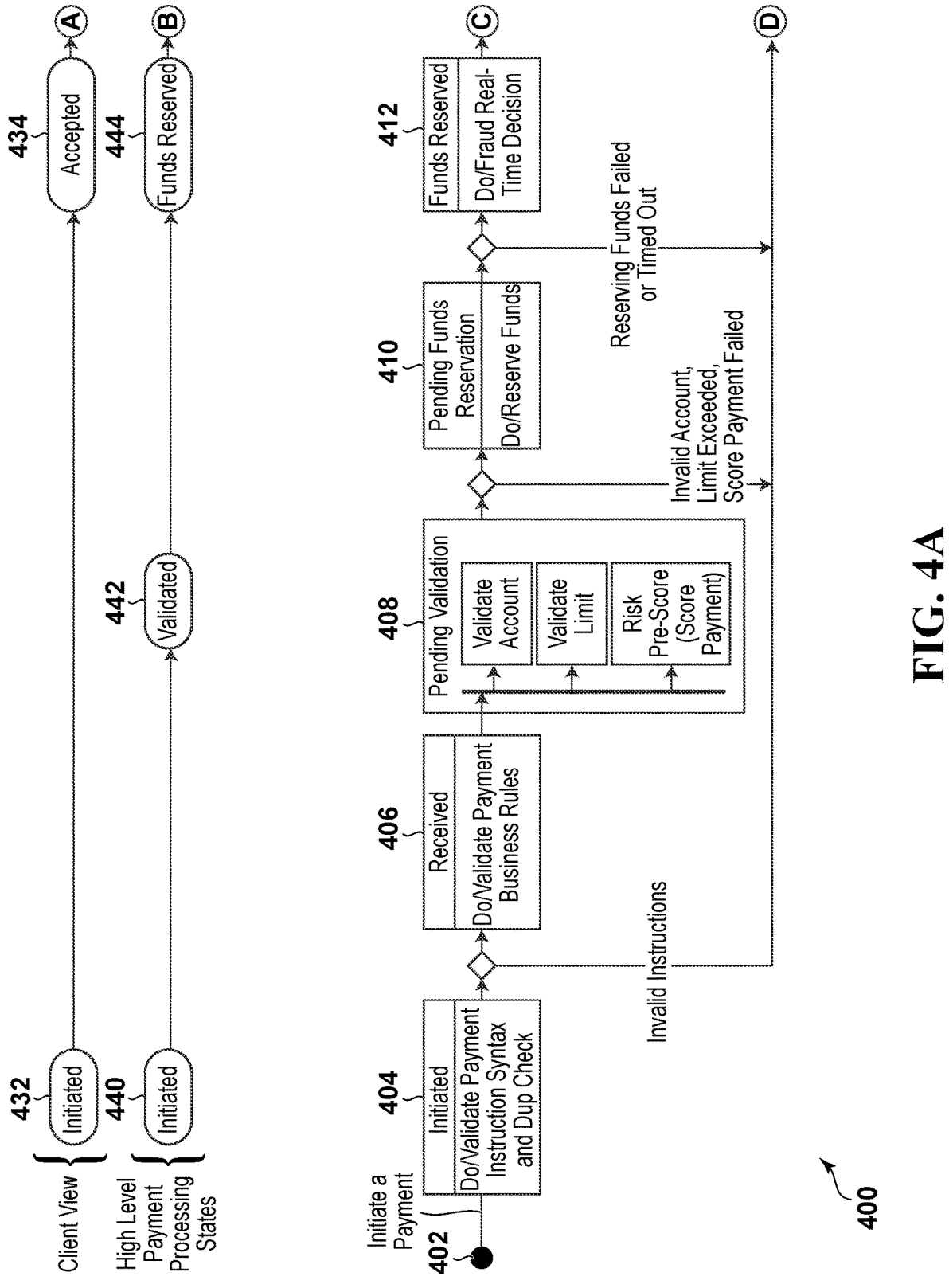
FIGS. 4A and 4B depict a payment state machine diagram implemented using the payment processing engine of FIGS. 1 and 2, according to an example embodiment.
Figure 4B:
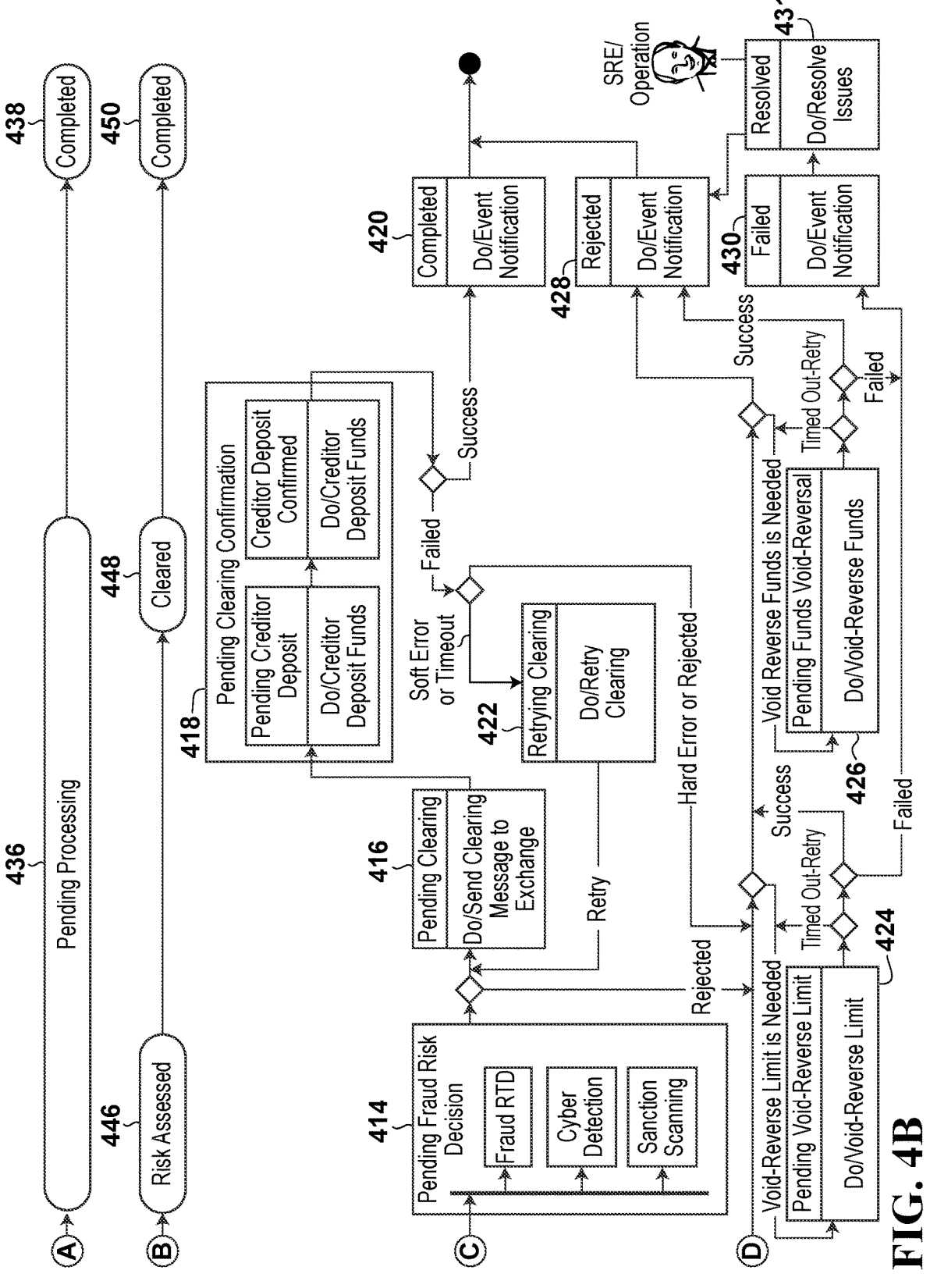

FIGS. 4A and 4B depict a payment state machine diagram 400 implemented by the PPE 102, according to an example embodiment. Blocks 402-430 describe various states of the PPE 102. Above those blocks are states representing the client's view of the payment, from initiated (block 432) to accepted (block 434) to pending processing (block 436) and then to completed (block 438); and high level payment processing states, from initiated (block 440) to validated (block 442) to funds reserved (block 444) to risk assessed (block 446) to cleared (block 448) to completed (block 450).

The state machine diagram 400 starts at block 402 at which the client initiates a payment. This transitions the PPE 102 to the "initiated" state (block 404) in which it validates payment instruction syntax and performs a duplicate check. Assuming the instruction is valid, the PPE 102 proceeds to the "received" state (block 406) where, in respect of the received payment instruction, it validates payment business rules. The PPE 102 then proceeds to the "pending valida-tion" state (block 408), in which the PPE 102 validates the account, limit, and risk pre-score (score payment) in respect of the proposed payment. Once validation is complete, the PPE 102 enters the "pending funds reservation state" (block 410) in which it reserves funds. If fund reservation is successful, the PPE 102 enters the "funds reserved" state (block 412) in which it performs real-time fraud detection. To do this, it enters the "pending fraud risk decision" state (block 414) in which the PPE 102 performs real time fraud detection, cyber detection, and sanction scanning. If fraud detection is satisfied, the PPE 102 enters into a "pending clearing" state (block 416) in which is sends a clearing message to an exchange. After block 416, the PPE 102 enters a "pending clearing confirmation" state (block 418) in which it secures the creditor's deposit. Assuming the payment clears, the PPE 102 enters the "completed" state (block 420) and sends the appropriate event notification such as via the notification system 124. If the payment is not cleared at block 418, the PPE 102 enters a "retrying clearing" state at block 422 where it returns to the "pending clearing" state and attempts again to clear the payment.

In certain situations, instead of the payment being completed, the payment may be rejected as represented by the PPE 102 entering the "rejected" state at block 428 or failed as represented by the PPE 102 entering the "failed" state at block 430. In both the rejected and failed states, the PPE 102 sends an appropriate event notification via the notification system 124. If the PPE 102 enters the failed state, the error causing failure may be resolved (block 431) in which case the PPE 102 transitions to the rejected state at block 428.

The PPE 102 may enter the rejected state for any number of reasons. For example, the PPE 102 may enter the rejected state if payment cannot be cleared at block 418 because of a hard error or rejection; if the payment does not pass fraud risk detection at block 414; if funds cannot be reserved at block 410 because of a time out, for example; if the payment cannot be validated at block 408; or if the payment instructions are invalid at block 404.

The PPE 102 may enter the failed state if, for a payment that would otherwise be rejected at block 428, the PPE 102 attempts to reverse the payment limit by entering the "pend-ing void-reverse limit" state at block 424 or to reverse the payment itself by entering the "pending funds void-reversal" state at block 426. If the PPE 102 is unable to perform either reversal even after retrying, the PPE 102 enters the failed state at block 430. If the PPE 102 is in contrast successful, it enters the rejected state at block 428.

Figure 5:
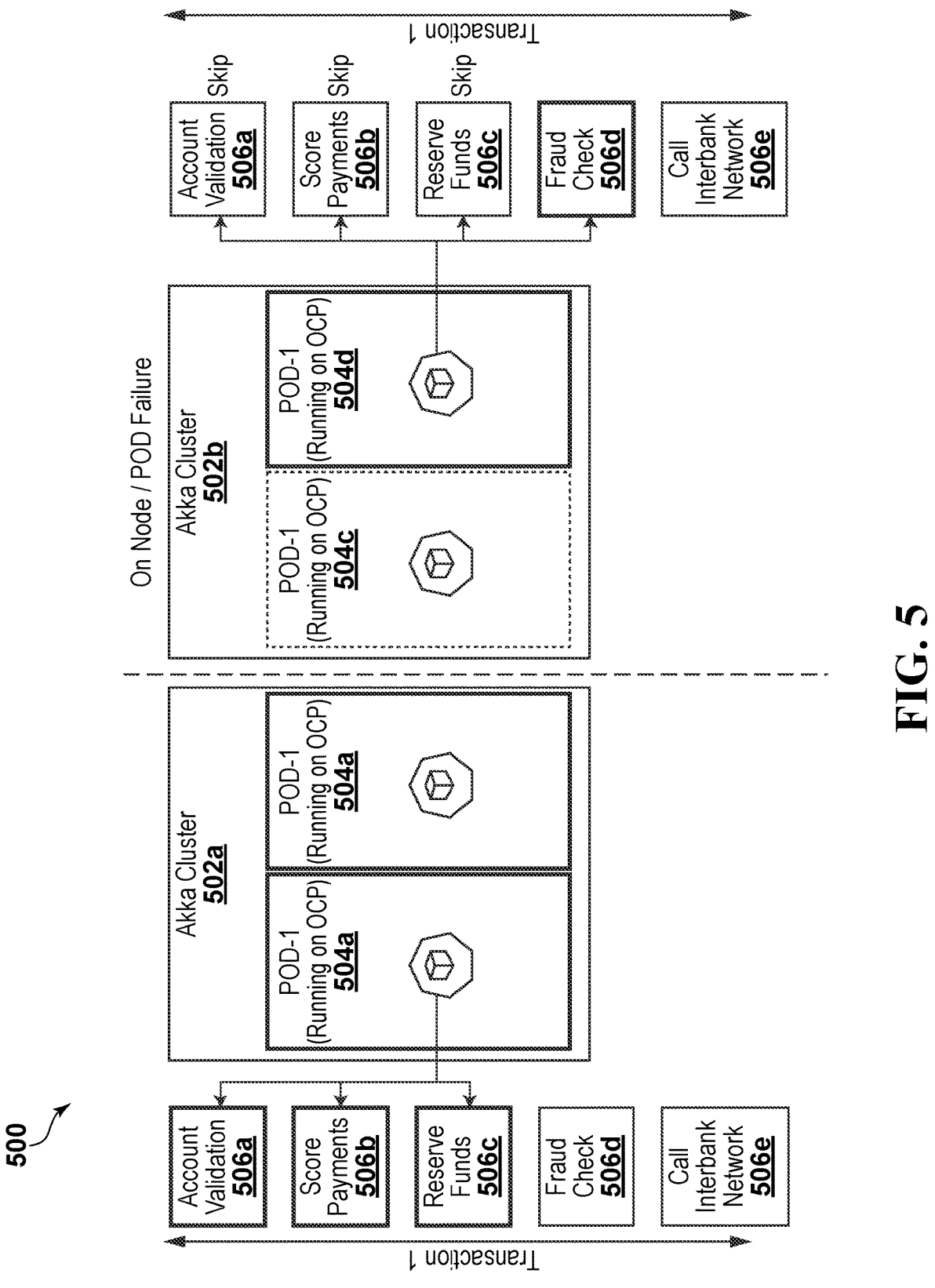
FIG. 5 depicts a block diagram of Akka™ clusters comprising part of the payment processing engine of FIGS. 1 and 2, in which the clusters can be used to implement fault redundancy, according to an example embodiment.

Referring now to FIG. 5, there is shown a block diagram 500 of first and second Akka™ clusters 502*a,b* comprising part of the PPE 102 that can be used to implement fault redundancy for the PPE 102. Each of the Akka™ clusters 502*a,b* may comprise one or more Akka™ actors used to implement the functionality of the PPE 102, as described above in FIGS. 1-4B. The first Akka™ cluster 502*a* comprises first and second pods 504*a,b* and the second Akka™ cluster 502*b* comprises third and fourth pods 504*c,d*; the pods 504*a-d* collectively run on OpenShift™ clusters and each of the pods 504*a-d* comprises one or more virtual or bare-metal machines used to perform the functionality of the PPE 102 described above. As shown in FIG. 5, each of the pods 504*a-d* may be used to perform first through fifth actions 506*a-e*, respectively comprising performing account validation, payment scoring, reserving funds, fraud checking, and making calls to the interbank network 110 such as the Interac™ network. These correspond to actions performed in respect of FIGS. 3A and 3B, described above.

The event journal 208 records events executed by an Akka™ actor so that it can be recovered when an actor is either restarted or terminated (e.g., after a Java™ virtual machine crashes or other exceptions). Events recorded in the event journal 208 can be retrieved, and this can be combined with the Akka™ cluster sharding feature to restart the failed actor on another node of the Akka™ cluster, thereby permitting the actor to resume operations where it stopped. This capability of the framework increases system resiliency; for example, if one of the pods 504*a-d* goes down, all the actors that consequently also go down can be restarted on another of the pods 504*a-d* attached to the Akka™ cluster and the PPE 102 may resume processing transactions from where it had stopped because of the one of the pods 504*a-d* going down.

In FIG. 5, for example, one or more actors comprising the first pod 504*a* perform the first through third actions 506*a-c* in respect of a particular payment transaction. After performing the first three actions 506*a-c* and funds have been successfully reserved as evidenced by the post-funds reservation message being stored in the first Kafka™ topic 210, the eleventh actor 302*k* receives confirmation that funds have been reserved and stores state information in the event journal 208 corresponding to the PPE's post-funds reservation state. When the first pod 504*a* fails or is otherwise unavailable, the fourth pod 504*d* accesses the inquiry database 206, which retrieves state information from the event journal 208, to determine that the first pod 504*a* has already reserved funds and consequently already performed the first through third actions 506*a-c*, and continues the transaction by restoring its state to the post-funds reservation state and begins by performing the fourth action 506*d* without having to re-perform the first through third actions 506*a-c*.

Figure 6:
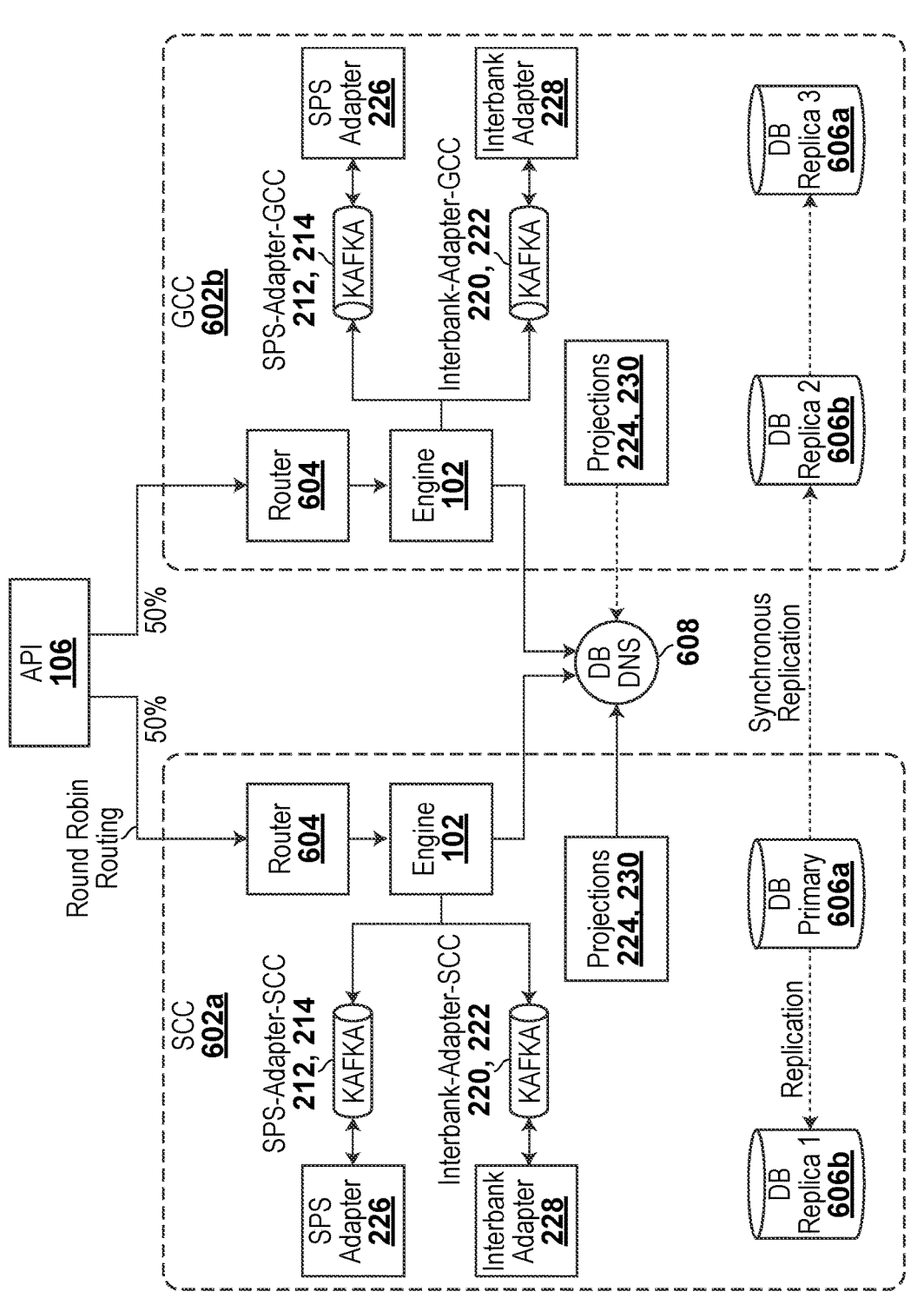
FIG. 6 depicts an architecture for the payment processing engine of FIGS. 1 and 2 that can be used to perform round robin routing and rolling updates, according to an example embodiment.

Referring now to FIG. 6, there is shown an architecture 600 for the PPE 102 that can be used to perform round robin routing sand rolling updates, according to an example embodiment. The architecture 600 comprises the input API 106, which is communicative with each of a primary system 602*a* and a secondary system 602*b*. The primary and secondary systems 602*a,b* may comprise two active-active (hot-hot) Akka™ clusters in two different data centers to provide high availability and load balancing. In FIG. 6, the primary and secondary systems 602*a,b* are structurally identical, with each comprising:

1. a router 604 that receives payment instructions via the input API 106;

2. the PPE 102, which receives instructions from the router 604 and is communicative with:

(a) the second and third Kafka™ topics 212, 214, which are communicative with the SPS adapter 226 (in an alternative embodiment, the PPE 102 may directly communicate with the SPS adapter 226 via REST API call(s), for example, in lieu of using the Kafka™ topics 212, 214);

(b) the sixth and seventh Kafka™ topics 220, 222, which are communicative with the interbank network adapter 228; and (c) a DNS 608, which allows the PPE 102 to write to a primary or secondary database 606*a,b* (each of the primary and secondary databases 606*a,b* generally represents the various databases depicted in FIGS. 2A and 2B and accordingly comprises, for example, the event journal 208); and 3. one or both of the first and second event projection modules 224, 230, which is communicative with the DNS 608.

In at least some example embodiments, the input API 106 may route traffic based on a round robin method. For example, as shown in FIG. 6 the input API 106 may route half the traffic to the primary system 602*a* and the other half to the secondary system 602*b*, each of which may be part of its own datacenter; alternatively, the input API 106 may unequally route traffic between the primary and secondary systems 602*a,b*. For each of the primary and secondary systems 602*a,b*:

1. The router 604 of each of the systems 602*a,b* is a simple router that routes traffic based on OpenShift™ routes.

2. The PPE 102 inserts a record into the primary database 606*a* upon receiving a transaction in order to check for duplicates. Event-sourced behavior is not involved until a response is received from the SPS adapter 226, thereby making the PPE 102 stateless until a response is sent back to the calling channel 104. The secondary database 606*b* is a replica of the primary database 606*a* for fault tolerance purposes. Additionally, the contents of the primary database 606*a* of one of the systems 602*a,b* is synchronously replicated as the databases 606*a,b* of the other of the systems 602*a,b* for fault tolerance purposes.

3. One or both of the first and second event projection modules 224, 230 listens to failures of the active projections module 224, 230 for its system 602*a,b*. In the event of a failure of the primary database 606*a* of one of the systems 602*a,b*, the PPE 102 of that system 602*a,b* may rely on the secondary database 606*b* of that system 602*a*. For example, when the database 606*a,b* of one of the systems 602*a,b* fails, the hostname to IP address is switched at the DNS 608, and the PPE 102 of the failed system 602*a,b* automatically connects to the failed over active database 606*a,b* instances (i.e., the database 606*a,b* of the other system 602*a,b* that remains operating). Alternatively, the PPE 102 of the system 602*a,b* whose database 606*a* has not failed may become the primary system and take over operations for the system 602*a,b* that suffered the failure.

The architecture 600 of FIG. 6 may also be used when updating the PPE 102 so as to permit the primary and secondary systems 602*a,b* to collectively provide payment processing functionality. Namely, instead of dividing traffic equally between the two systems 602*a,b*, the input API 106 may disproportionately direct the majority of traffic (e.g., 99%) to one of the systems 602*a,b*. The other of the systems 602*a,b* may be updated with new software and then, with reduced traffic, the functionality of the other of the systems 602a,b (which has been upgraded) may be tested. Once testing is complete and the upgraded system 602a,b has passed, traffic may be analogously disproportionately routed to the upgraded system 602a,b and the other system 602a,b may then be upgraded and tested. Once the other system 602a,b is upgraded and passes testing, the input API 106 may again route traffic normally (e.g., 50/50) between the two systems 602a,b.

Figure 7A:
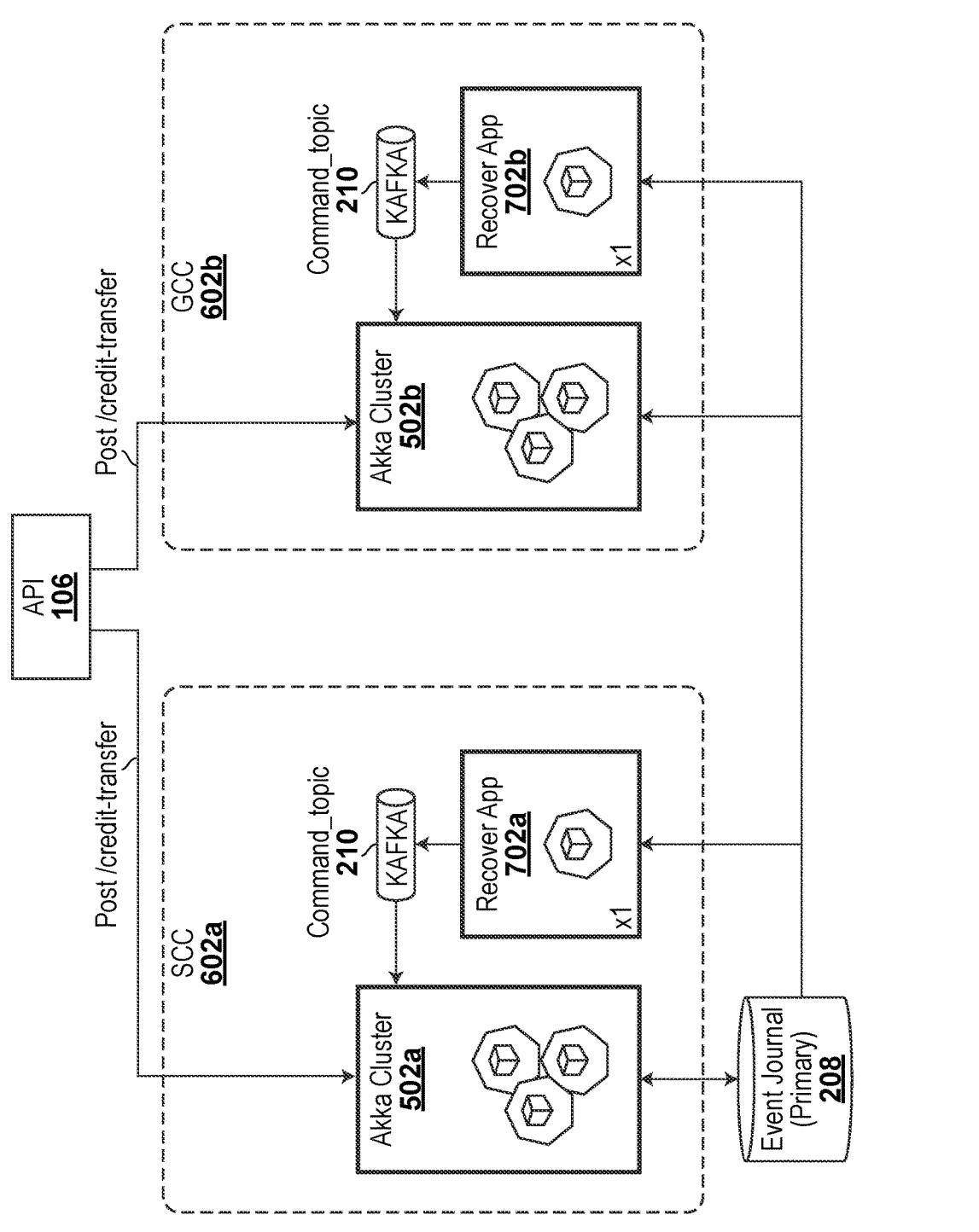
FIGS. 7A, 7B, and 8 depict operation of a recovery application comprising part of the payment processing engine of FIGS. 1 and 2.
Figure 7B:
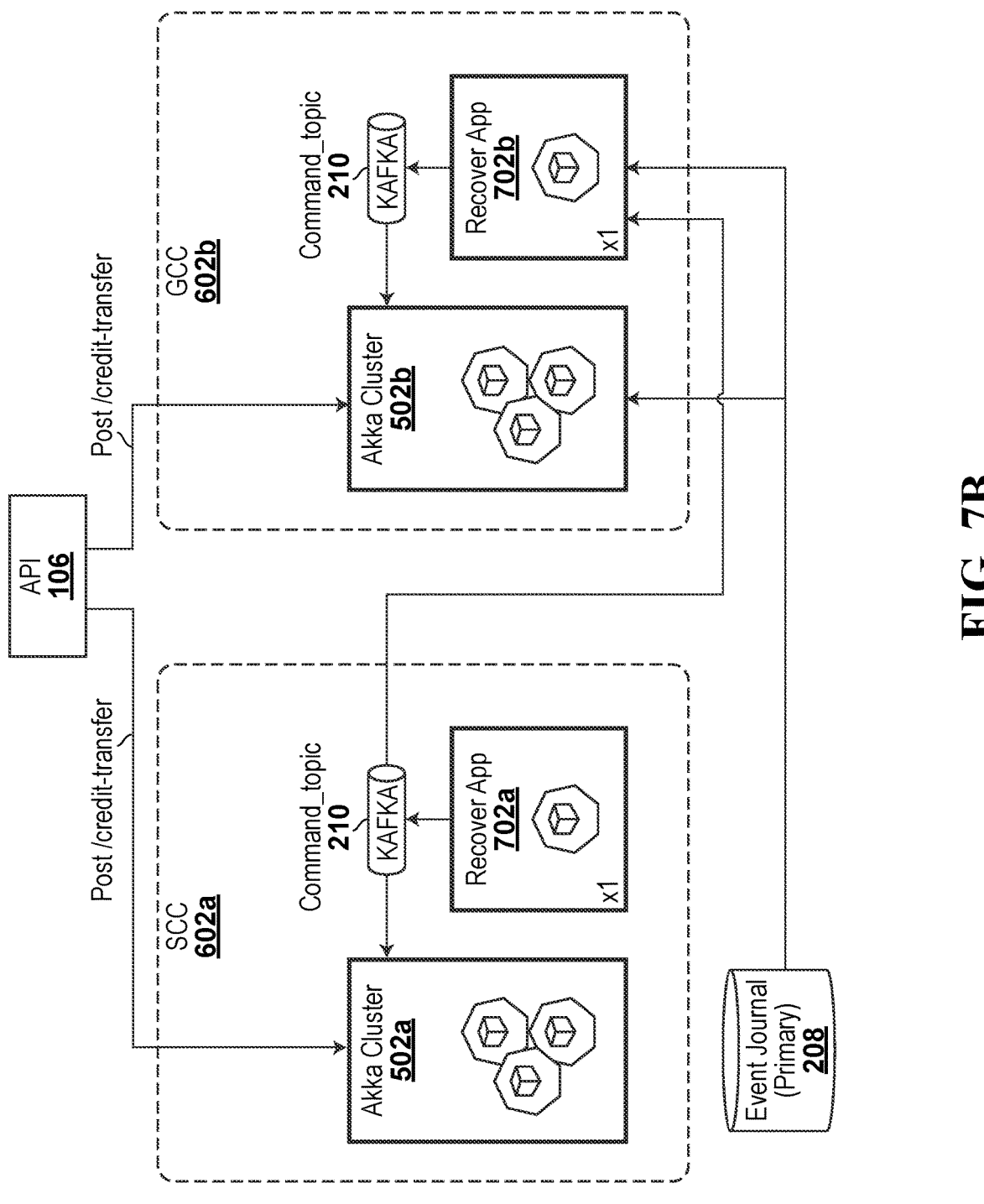
Figure 8:
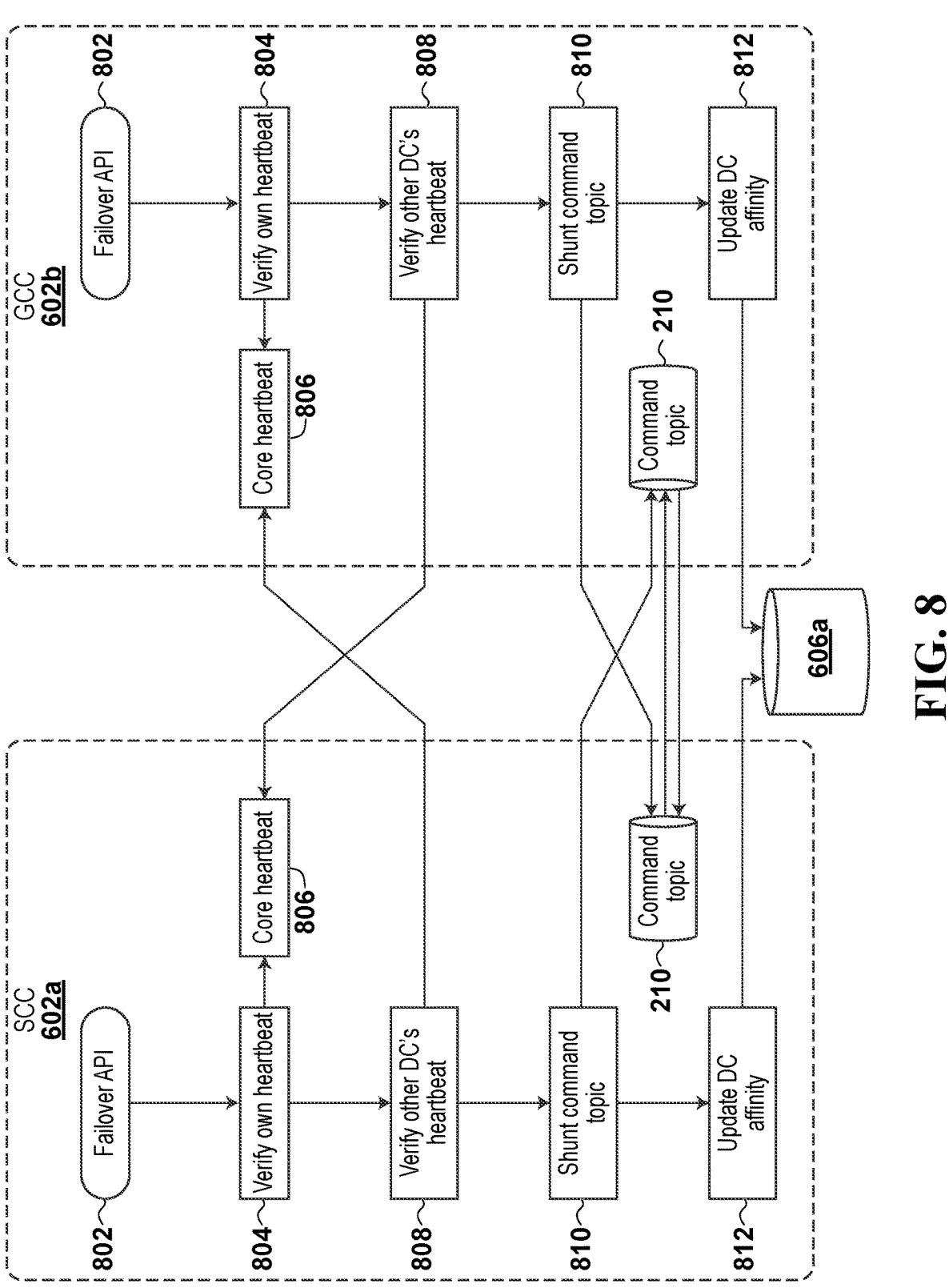

FIGS. 7A, 7B, and 8 depict operation of a recovery application comprising part of the PPE 102, according to an example embodiment. Each of FIGS. 7A and 7B depicts a system architecture for the PPE 102 that comprises a primary system 602a and a secondary system 602b; the systems 602a,b may both comprise data centers, for example, with the primary system 602a being the primary data center and the secondary system 602b being the redundant, backup data center.

FIG. 7A shows the PPE 102 during normal operation. The primary system 602a comprises the first Akka™ cluster 502a, the first Kafka™ topic 210, and a recovery application 702a. The recovery application 210 can push commands to the first Kafka™ topic 210, and the first Akka™ cluster 502a subscribes to the first Kafka™ topic 210 and accordingly retrieves those commands for execution. The secondary system 602b analogously comprises the second Akka™ cluster 502b, another instance of the first Kafka™ topic 210, and another instance of the recovery application 702b. The event journal 208 is external of the primary and secondary systems 602a,b and is communicatively with both of the Akka™ clusters 502a,b and both of the recovery applications 702a,b.

FIG. 7A depicts the PPE 102 in normal operation. Namely, calls from the input API 106 are sent to both the first and second Akka™ clusters 502a,b. The primary system 602a operates normally and performs all of the PPE's 102 functionality as described in respect of FIGS. 1 to 3B. FIG. 7B depicts the PPE 102 when the primary system 602a is non-functional. In FIG. 7B, the event journal 208 no longer communicates with the primary system 602a, and pending commands from the first Kafka™ topic 210 of the primary system 602a are routed to the recovery application 702b of the secondary system 602b. These routed, or "shunted", commands are pushed to the instance of the first Kafka™ topic 210 of the secondary system 602b and executed by the second Akka™ cluster 502b. Once the shunted commands are processed, the secondary system 602b can continue indefinitely by processing commands received from the input API 106.

FIG. 8 depicts how the primary and secondary systems 602a,b transition from the normal operation of FIG. 7A to the redundant functionality demonstrated in FIG. 7B. Each of the primary and secondary systems 602a,b is shown with their own instances of the first Kafka™ topic 210 and their respective recovery applications 702a,b otherwise perform identical operations 802-812, as described below. While the operations below are described in respect of the secondary system 602b taking over from the primary system 602a, the primary system 602a performs identical functionality when taking over from the secondary system 602b.

At block 802, the secondary system 602b receives a failover API call via the input API 106. The failover API instructs the secondary system 602b to potentially take over the functionality performed by the primary system 602a, which may be required on account of the primary system 602a having suffered some kind of fault, for example. In response to receiving the API call 802, the recovery application 702b verifies the secondary system's 602b own core application (i.e., its Akka™ cluster 502b) is available by checking its heartbeat at block 806. If that heartbeat is absent, the depicted method ends and blocks 808 to 812 are not performed. Assuming the recovery application 702b detects a heartbeat at block 806, it then checks to determine whether the core application of the primary system 602a (i.e., the Akka™ cluster 502a of the primary system 602a) is present. If not, that indicates the primary system 602a is in a fault state and cannot be relied upon to function normally.

If the recovery application 702b determines that the primary system 602a is in some kind of fault state at block 808, it shunts commands from the first Kafka™ topic of the primary system 602a to the first Kafka™ topic of the secondary system at block 810. This allows the secondary system 602b to perform the pending commands stored in the first Kafka™ topic of the primary system 602a. The recovery application 702b then updates a datacenter affinity parameter in the database 606a so that subsequent commands from the input API 106 are automatically routed to the secondary system 602b for execution.

At the time of switching over from the primary system 602a to the secondary system 602b, the primary system 602a may have already commenced performance of certain commands and be waiting for a response from external services such as the interbank network 110. Commands left in such a wait state may be handled in different ways. For example, certain requests such as SPS requisitions may timeout and consequently be voided; RTD transactions, such as fraud determinations, may be automatically approved or rejected by default; and certain other calls, such as to the interbank network 110, may be automatically retried.

Figure 9:
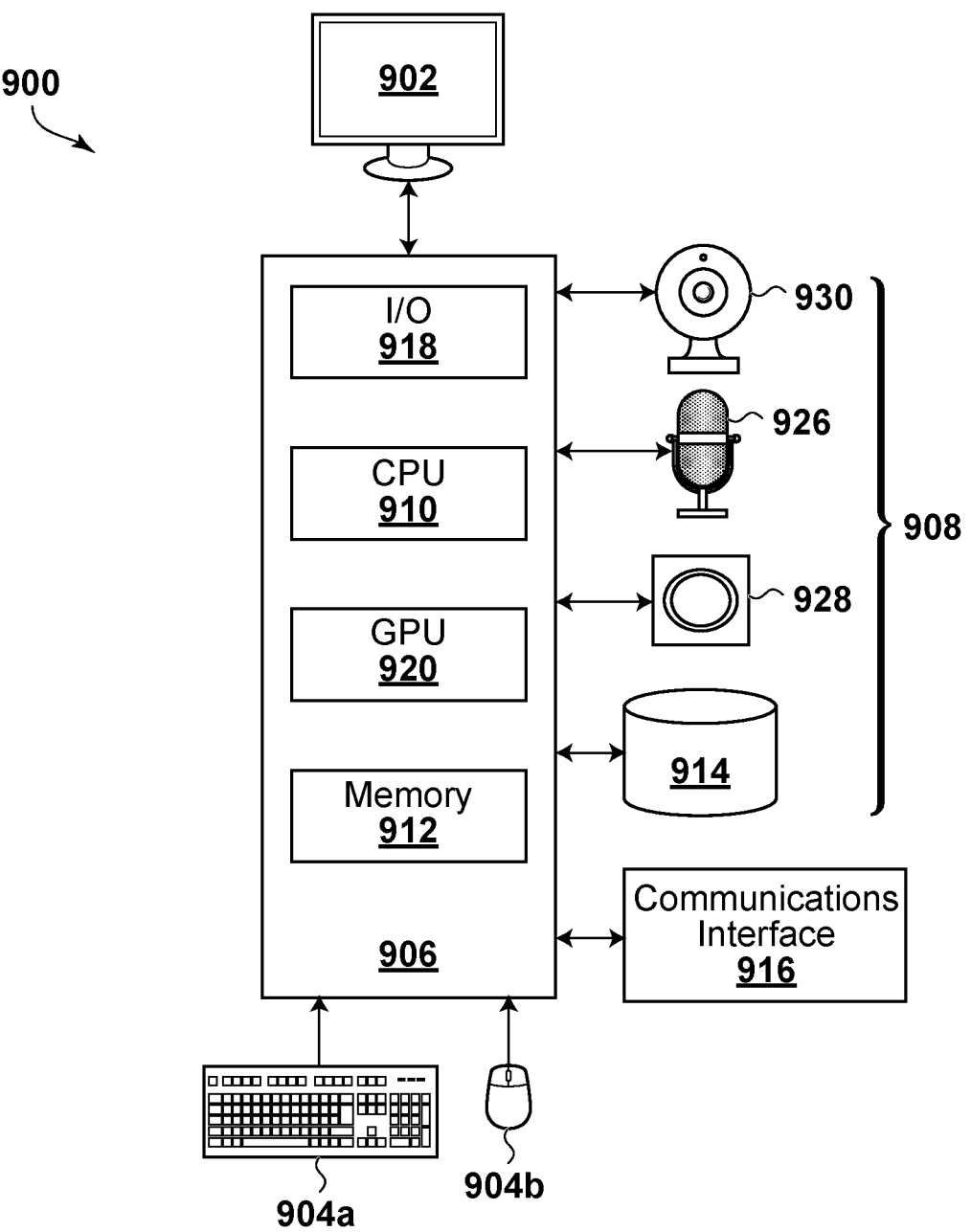
FIG. 9 depicts an example computer system that may be used as servers, event engines, or event consumers of the payment processing engine of FIG. 1.

An example computer system in respect of which the technology and more particularly the PPE 102 herein described may be implemented is presented as a block diagram in FIG. 9. The example computer system is denoted generally by reference numeral 900 and includes a display 902, input devices in the form of keyboard 904a and pointing device 904b, computer 906 and external devices 908. While pointing device 904b is depicted as a mouse, it will be appreciated that other types of pointing device, or a touch screen, may also be used.

The computer 906 may contain one or more processors or microprocessors, such as a central processing unit (CPU) 910. The CPU 910 performs arithmetic calculations and control functions to execute software stored in a non-transitory internal memory 912, preferably random access memory (RAM) and/or read only memory (ROM), and possibly additional memory 914. The additional memory 914 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 914 may be physically internal to the computer 906, or external as shown in FIG. 9, or both.

The one or more processors or microprocessors may comprise any suitable processing unit such as an artificial intelligence accelerator, programmable logic controller, a microcontroller (which comprises both a processing unit and a non-transitory computer readable medium), AI accelerator, system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal and/or additional memory 914 for execution by the one or more processors or microprocessors.

The computer system 900 may also include other similar means for allowing computer programs or other instructions to be loaded. Such means can include, for example, a communications interface 916 which allows software and data to be transferred between the computer system 900 and external systems and networks. Examples of communications interface 916 can include a modem, a network interface such as an Ethernet card, a wireless communication interface, or a serial or parallel communications port. Software and data transferred via communications interface 916 are in the form of signals which can be electronic, acoustic, electromagnetic, optical or other signals capable of being received by communications interface 916. Multiple interfaces, of course, can be provided on a single computer system 900.

Input and output to and from the computer 906 is administered by the input/output (I/O) interface 918. This I/O interface 918 administers control of the display 902, keyboard 904a, external devices 908 and other such components of the computer system 900. The computer 906 also includes a graphical processing unit (GPU) 920. The latter may also be used for computational purposes as an adjunct to, or instead of, the (CPU) 910, for mathematical calculations.

The external devices 908 include a microphone 926, a speaker 928 and a camera 930. Although shown as external devices, they may alternatively be built in as part of the hardware of the computer system 900.

The various components of the computer system 900 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise (e.g., a reference in the claims to "an actor" or "the actor" does not exclude embodiments in which multiple actors are used). It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections.

Phrases such as "at least one of A, B, and C", "at least one of A, B, or C", "one or more of A, B, and C", and "A, B, and/or C" are intended to include both a single item from the enumerated list of items (i.e., only A, only B, or only C) and multiple items from the list (i.e., A and B, B and C, A and C, and A, B, and C). Accordingly, the phrases "at least one of", "one or more of", and similar phrases when used in conjunction with a list are not meant to require that each item of the list be present, although each item of the list may be present.

It is contemplated that any part of any aspect or embodiment discussed in this specification can be implemented or combined with any part of any other aspect or embodiment discussed in this specification, so long as such those parts are not mutually exclusive with each other.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A payment processing method comprising:
   (a) receiving a payment instruction;
   (b) storing, in an event journal, an event corresponding to the payment instruction; and (c) performing the payment instruction using an event-sourced, actor-based system, wherein performing the payment instruction comprises:

transitioning the actor-based system through one or more states in response to the payment instruction; and performing at least one action in a stateless environment comprising at least one non-event sourced actor and, subsequently, at least one action in a stateful environment comprising at least one event sourced actor, wherein a payment is made in response to the payment instruction in the stateful environment;

(d) publishing, by the at least one non-event sourced actor, at least one command into a command store, the command store storing the at least one command and dividing processing of the payment instruction between the stateless environment and the stateful environment; and (e) retrieving, by the at least one event sourced actor, the at least one command from the command store.

2. The method of claim 1, wherein the command store comprises a Kafka™ topic.

3. The method of claim 1, wherein the at least one event sourced actor performs a real-time fraud determination on the payment instruction prior to making the payment.

4. The method of claim 1, wherein the at least one non-event sourced actor performs payment fund reservation in the stateless environment.

5. The method of claim 4, wherein the at least one non-event sourced actor further performs at least one of account validation or payment scoring in the stateless environment.

6. The method of claim 1, further comprising:

(a) publishing, by the at least one non-event sourced actor, at least one message to the command store;

(b) retrieving, by the at least one event sourced actor, the at least one message; and (c) in response to each of the at least one message, using the at least one event sourced actor to write state information representative of a current state of the at least one event sourced actor to the event journal.

7. The method of claim 6, wherein the at least one message published by the at least one non-event sourced actor comprises a post-funds reservation message confirming funds for the payment have been reserved.

8. The method of claim 6, wherein the at least one message published by the at least one non-event sourced actor comprises a pre-funds reservation message confirming a request to reserve the funds for the payment has been made and the funds are not yet reserved.

9. The method of claim 6, further comprising, in response to a fault during performing of the at least one action in the stateful environment:

(a) retrieving the state information from the event journal; and (b) continuing performance of the at least one action in the stateful environment from a state corresponding to the state information.

10. The method of claim 9, wherein the at least one non-event sourced actor and the at least one event sourced actor comprise part of a cluster of the actors redundantly implemented on at least a first pod and a second pod, wherein each of the pods comprises at least one commonly hosted container, wherein the fault is experienced by one of the pods, and wherein the state information is retrieved from the event journal and the performance is continued by the other of the pods.

11. The method of claim 1, wherein the payment instruction comprises one of a plurality of payment instructions, wherein the actor-based system is redundantly implemented using a primary system and a secondary system, wherein each of the primary and secondary systems comprises the command store, a cluster of the actors, and a recovery application, and wherein the method further comprises:

(a) processing an initial group of the plurality of payment instructions using the primary system; and (b) in response to unavailability of the primary system:

(i) using the recovery application of the secondary system, shunting unperformed commands from the command store of the primary system to the command store of the secondary system for performance; and (ii) processing the plurality of payment instructions after the initial group using the secondary system.

12. The method of claim 11, wherein in response to unavailability of the primary system and prior to shunting the unperformed commands, the recovery application of the secondary system further:

(a) verifies, using a heartbeat of the secondary system, that the secondary system is healthy; and (b) verifies, using a heartbeat of the primary system, and that the primary system is unhealthy.

13. The method of claim 11, wherein in response to unavailability of the primary system, the recovery application of the secondary system further updates a datacenter affinity parameter such that the plurality of payment instructions after the initial group are processed by the secondary system.

14. The method of claim 1, wherein the payment instruction comprises one of a plurality of payment instructions, wherein the actor-based system is redundantly implemented using a primary system and a secondary system, and further comprising:

(a) disproportionately routing the plurality of payment instructions to either the primary system or the secondary system;

(b) updating software of the one of the primary system or the secondary system receiving disproportionately fewer of the plurality of payment instructions; and (c) after the updating:

(i) disproportionately routing the plurality of payment instructions to the other of the primary system or the secondary system; and (ii) updating software of the other of the primary or the secondary system.

15. The method of claim 1, wherein the actor-based system is redundantly implemented using a primary system and a secondary system, wherein the primary system comprises a primary system database and the secondary system comprises a secondary system database, wherein the secondary system database is a replica of the primary system database, wherein each of the primary and secondary systems determines whether to write to the primary system database or the secondary system database using a domain name server, and further comprising:

(a) detecting a failure in the primary system database; and (b) updating the domain name server to route database reads and writes of the primary and secondary systems to the secondary system database.

16. A payment processing system comprising:

(a) an event journal;

(b) an event-sourced, actor-based payment processing engine configured to perform a method comprising:

(i) receiving a payment instruction;

(ii) storing, in the event journal, an event corresponding to the payment instruction; and (iii) performing the payment instruction, wherein performing the payment instruction comprises:

transitioning the payment processing engine through one or more states in response to the payment instruction; and performing at least one action in a stateless environment comprising at least one non-event sourced actor and, subsequently, at least one action in a stateful environment comprising at least one event sourced actor, wherein a payment is made in response to the payment instruction in the stateful environment;

(iv) publishing, by the at least one non-event sourced actor, at least one command into a command store, the command store storing the at least one command and dividing processing of the payment instruction between the stateless environment and the stateful environment; and (v) retrieving, by the at least one event sourced actor, the at least one command from the command store.

17. A non-transitory computer readable medium having encoded thereon computer program code that is executable by a processor and that, when executed, causes the processor to perform a payment processing method comprising:

(a) receiving a payment instruction;

(b) storing, in an event journal, an event corresponding to the payment instruction; and (c) performing the payment instruction using an event-sourced, actor-based system, wherein performing the payment instruction comprises:

transitioning the actor-based system through one or more states in response to the payment instruction; and performing at least one action in a stateless environment comprising at least one non-event sourced actor and, subsequently, at least one action in a stateful environment comprising at least one event sourced actor, wherein a payment is made in response to the payment instruction in the stateful environment;

(d) publishing, by the at least one non-event sourced actor, at least one command into a command store, the command store storing the at least one command and dividing processing of the payment instruction between the stateless environment and the stateful environment; and (e) retrieving, by the at least one event sourced actor, the at least one command from the command store.

* * * * *